March 13, 1934.  P. BALZE  1,951,122
INTERLOCKED SOLDER JOINT AND METHOD OF MAKING THE SAME
Filed Nov. 20, 1931

INVENTOR
Paul Balze
BY
Chris Shumacher
ATTORNEY

Patented Mar. 13, 1934

1,951,122

UNITED STATES PATENT OFFICE 1,951,122

INTERLOCKED SOLDER JOINT AND METHOD OF MAKING THE SAME

Paul Balze, Leonia, N. J.

Application November 20, 1931, Serial No. 576,264

12 Claims. (Cl. 29—148.2)

This invention relates to joints and methods of making the same.

One object of this invention is to provide a joint between a plurality of tubular members, one of which consists of a soft or fusible metal having an improved mechanical connection which is adapted to be supplemented by a fusible metal or solder connection.

Another object of the invention is the provision of a device of the nature set forth including an improved joint for a plurality of tubular members one of which consists of a soft metal and is forced into a conical groove in the other member, and there being a continuous fusible metal or solder connection between the opposite walls of the groove and the faces of the soft metal member; another object is to furnish a joint of the character described having an end of the soft metal member expanded into a groove which is of the proper form; and another object is to so arrange the groove that an acute angle edge is afforded to avoid a shoulder or obstruction at the joint against the flow of materials through the joint.

Another object of the invention is to provide an improved method of making a joint with a soft or fusible metal pipe, whereby the pipe is deformed or expanded into connection in situ, and then soldered if desired, so that wiped solder joints may be eliminated, especially in plumbing; this method has application to tubular members which may be of the same material, strength in tension and compression, or hardness, or where one member may expand by reason of lesser strength in tension than the strength of the companion member in compression; and while only one of the members is expanded, both of the members may be deformed.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Figure 1:
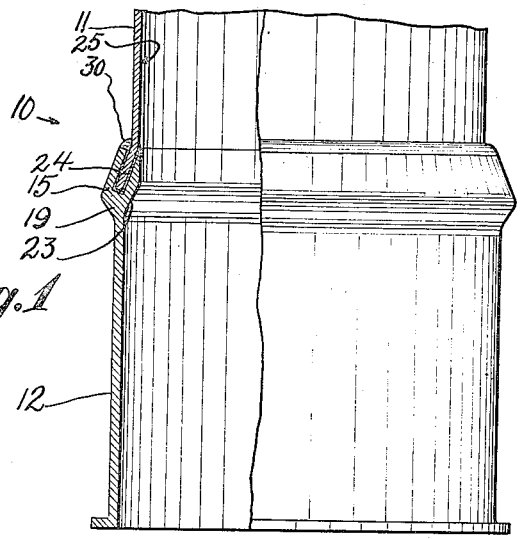
Figure 1 is a view in elevation with a part in section showing a device embodying the invention.
Figure 2:
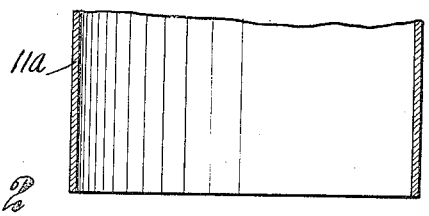
Fig. 2 is a view of parts of the joint in separated relation.
Figure 3:
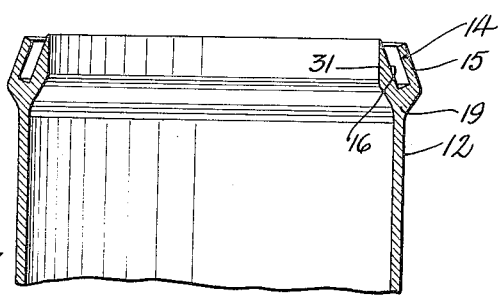
Fig. 3 is an enlarged fragmentary sectional view of the joint.
Figure 3:
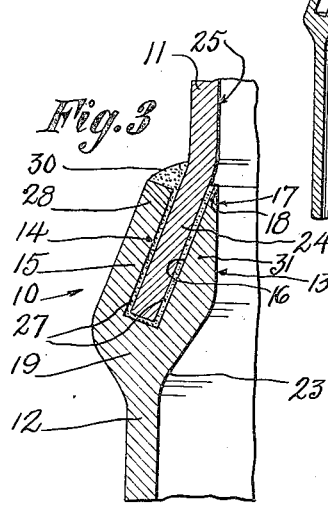

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Generally described, this invention provides a joint and method of making the same, which while applicable to different arts, has particular reference to plumbing, and the wiped solder joints employed therein. The latter are difficult and tedious to make and require considerable experience for producing a tight and strong joint. Since these joints generally include a hard metal member such as a brass ferrule, and a soft or fusible metal member such as a piece of lead pipe, the former is provided at an end with an annular groove of varying or increasing diameter into which an annular end portion of the lead pipe may be deformed or expanded as by pressure or by a spinning operation. This expansion is easily accomplished and in a uniform manner, being easier to effect than a compression for decreasing the size of the member. In this manner an interlocking connection is effected between the members so that the same cannot be separated, and a fairly tight joint is obtained. This joint may, however, be made absolutely gas tight by additionally uniting the members together at the joint, as by a fusible metal or solder at the groove, and preferably by so disposing or pouring molten solder into the groove as to cause the solder to unite the expanded part of the lead pipe to the groove at opposite faces thereof, increasing the strength of the joint. Although reference is made to groove, it will be understood that a tapered annular shoulder may be utilized to expand the lead pipe, although the groove affords the superior interlocking construction. An important feature of the invention is that the shoulder or inner wall of the groove tapers to intersect the inner surface of the ferrule at an acute angle, so that the inner surfaces of both members are substantially coincident, thereby avoiding the formation of a shoulder that might collect material and hence be objectionable in a sanitary plumbing system. Thus various characteristics of the joint are coordinated since the increasing diameter of the groove results in the combined advantages of affording the inner acute angle engagement and the expanded interlocking of the soft and hard metal tubular members; these advantages are also obtained with copper and even soft steel tubing.

Referring in detail to the drawing, 10 denotes a device embodying the invention. The same may include a joint of any suitable character, preferably of the type that is used in plumbing work, and may include a plurality of circular or tubular members 11, 12 at least one of which is a soft material or metal member. The other member may be relatively stronger, as by having a thicker wall, or a re-enforcement, or by being made of a stronger material. Specifically, the member 11 may be in the nature of a piece of pipe of lead or other ductile metal which may or may not be fusible, while the member 12 may be a ferrule made of a hard metal such as brass. It will be further noted that the materials are such that they can be joined by welding, soldering, cementing, or heat treatment, and the like.

Disposed at a suitable point along the length of the nonyielding member or ferrule is an annular joint forming means 13. Preferably the latter is in the nature of a groove 14 provided in an end portion 15 of the ferrule, and the groove being of any varying diameter along the length of the ferrule. For example, the groove may diverge toward the opposite end of the ferrule, and hence may be of increasing diameter. Consequently, the groove, and more particularly the inner surface 16 thereof intersects the inner surface 17 of the ferrule at an acute angle at 18, affording a uniformly gradual approach to the groove from a cylindrical or other surface defining the inside face of the ferrule at the joint. One construction may include providing an enlargement or relatively non-yielding portion 19 on the ferrule, in which enlargement the groove may be cast, cut, stamped, or otherwise formed. This enlargement may be divergent in a manner consistent with that of its groove 14. Preferably the inner diameter of the enlargement is less than the inner diameter of the ferrule, as indicated by an offset at 23, since the member 11 is of somewhat smaller diameter than the ferrule that is used therewith.

The yielding member or lead pipe 11 has an element or portion 24 positioned therealong, preferably at an end thereof and engaged around the conical surface 16. Hence this member 11 may be interlocked in the groove 14. As shown in the drawing, the portion 24 is of increasing diameter relatively to the main section of the lead pipe, whose inner surface 25 is substantially coincident with that of the inner surface 13 of the ferrule at the joint. The portion 24 of the lead pipe represents an expanded condition of the end thereof to interlock in the groove 14.

To cause a fluid-tight connection between the members 11, 12, the same may be joined together, for instance, by pouring in molten solder 27 into the groove 14. One method of soldering the joint is to coat the end of the pipe and the groove with a flux in paste form. Then the pipe is locked into the groove by driving the ferrule onto the pipe. Then the ferrule is heated to the melting point of solder, and cold solder in bar form rubbed thereon to run into the groove. The solder spreads throughout the joint by its own weight and by capillary attraction. Thus the solder, which is extremely fluid when well heated, runs completely around the portion 24 so as to unite substantially all faces thereof with the walls of the groove. During this operation heat may be applied to the joint by a blow torch if necessary to assure complete and uniform union. To avoid the loss of any substantial amount of solder by spilling from the inner side of the groove, the outer edge 28 at the groove may be somewhat lower than the inner edge 18 thereof. At said outer edge 28, the solder may be left flush or built up in a strengthening ring 30.

The method of making the joint will now be briefly described. The member or lead pipe 11a is placed with its end around the shoulder 31, and the lead pipe worked in a suitable manner to expand the end thereof into the groove 14. For instance, the axial force may be applied to the ferrule. If desired, the ferrule or lead pipe may be turned back and forth, accomplishing the equivalent of a spinning operation, though this is not usually necessary, and the lead pipe may thus be gradually expanded and entered into the ferrule groove. Then the sealing or soldering operation is effected and the joint is complete. It will be understood that brazing or other methods may also be used, or that various hardening, plastic, cushioning, or adhesive materials may be placed into the groove for sealing the joint. The term soldering is thus used in an illustrative sense.

I have also found that I can drive a brass ferrule onto a brass tube, effecting a joint according to my invention. Hence the term soft metal is to be construed in an illustrative, not in a limiting sense, and the members may be described as relatively yielding and nonyielding.

It is noteworthy that this joint may be made in situ, without requiring any special tools, as, in fact, the joint parts constitute the means for making the joint. Furthermore, no precise relationship is necessary as between the sizes of the lead pipe and ferrule, since the former may ordinarily be adjusted in size, where required, to fit the entrance to the groove 14, after which the expanding operation occurs.

The joint may be made either before or after the ferrule has been connected to the bell of the cast iron soil pipe in the usual manner with oakum and lead calked around the joint.

It will be appreciated that various changes and modifications may be made in the device as shown in the drawing, and that the same is submitted in an illustrative and not in a limiting sense, the scope of the invention being defined in the following claims.

I claim:

1. A joint including a hard metal tubular member having an integral annular end portion whose inner diameter is less than the inner diameter of the rest of the member, the inner face of the end portion being substantially cylindrical, said end portion diverging toward the opposite end of the member and having a correspondingly divergent annular groove therein, said groove intersecting the inner cylindrical surface to form an acute angle annular edge, and a soft metal tubular member having an end portion divergingly expanded into said groove to form a locking connection therewith, the inner surface of the soft metal member being substantially in coincidence with the inner surface of said end portion, and a fusible metal seal at said groove uniting the members continuously together.

2. A joint including a plurality of tubular members, one of said members having an integral portion having a coaxial annular groove in the wall thereof, said groove being of increasing diameter, and the other member having an end thereof expanded into said groove, the groove intersecting the inner surface of its tubular member at an acute angle to provide a thin edge, and the said thin edge lying substantially in the cylindrical surface of said other member, whereby a relatively smooth inner surface is provided for the joint.

3. A joint including a hard metal tubular member and a soft metal tubular member, the hard metal member having an integral one piece portion having an annular groove of increasing diameter, the said groove intersecting the interior surface of the hard metal member at an acute angle, the soft metal member having an end thereof expanded in said groove for interconnecting the members, with no part of the hard metal member having a smaller internal diameter than that of the soft metal member.

4. A joint including a first and a second tubular member, the first tubular member having an integral portion having a coaxial annular groove of increasing diameter, said groove intersecting the interior surface of the first member at an acute angle to form a relatively sharp edge, said interior surface terminating at said edge, the second member having an end thereof divergingly expanded in said groove and having its expanded portion confined to said groove and its internal surface of substantially equal diameter with that of said thin edge, and no part of the internal surface of said first member being less in diameter than the diameter of the second member, and a sealing means in said groove for interengaging said members in a fluidtight manner.

5. A joint including a plurality of substantially cylindrical tubular members, one of said members having an integral portion having a coaxial annular groove, said groove being of increasing diameter, and the other member having an end expanded into said groove, the said integral portion having a wall between said groove and the internal surface of the first mentioned member, said wall being relatively narrow at the end thereof, and the inner surface of the first mentioned member at said wall lying approximately in the cylindrical surface of the said other member.

6. A joint including a hard metal tubular member and a soft metal tubular member, the former having an integral portion having a coaxial annular groove of increasing diameter, the soft metal member having an end expanded into said groove, and the members being so angularly related in proximity to the groove that the internal surfaces of the members are of approximately the same diameter adjacent to the joint.

7. A joint including a hard metal tubular member and a soft metal tubular member, the former having an integral portion having a coaxial annular groove of increasing diameter, the soft metal member having an end expanded into the groove, the groove forming a relatively thin acute angle end with the internal surface of the hard metal member, and said internal surface of the hard metal member lying approximately in the internal surface of the soft metal member.

8. A joint including a plurality of substantially cylindrical tubular members, one of said members having an integral portion having a coaxial annular groove, said groove being of increasing diameter, and the other member having an end expanded into said groove, the said integral portion having a wall between said groove and the internal surface of the first mentioned member, said wall being relatively narrow at the end thereof, with no part of the first mentioned members having a smaller internal diameter than that of the other member.

9. A joint including a plurality of substantially cylindrical tubular members, one of said members having an integral portion having a coaxial annular groove, said groove being of increasing diameter, and the other member having an end expanded into said groove, the said groove substantially intersecting the inner surface of its tubular member at an acute angle, with no part of the first mentioned member having a smaller internal diameter than that of the other member.

10. The method of joining a plurality of tubular members one of which is provided with an integral portion having an annular groove of increasing diameter substantially intersecting the inner surface thereof at an acute angle, which method includes expanding an end portion of the other tubular member into said groove so that the internal surfaces of the members are substantially coincident, and sealing the members together at the groove.

11. A joint including a hard metal tubular member and a soft metal tubular member, said hard metal member having an annular divergent groove substantially intersecting the inner surface of said member at an acute angle, and the soft metal member having an end expanded into said groove, and no part of the hard metal member being of smaller internal diameter than that of the soft metal member.

12. The method of making a joint which includes providing one of the members with a divergent annular groove forming an annular acute angle portion with the internal surface of the member, and axially forcing an end portion of a second tubular member into said groove for expanding said end portion into interlocking engagement in the groove so that the internal surfaces of the members are of substantially equal diameter at the joint.

PAUL BALZE.